United States Patent [19]
Koike et al.

[11] Patent Number: 5,751,671
[45] Date of Patent: May 12, 1998

[54] INFORMATION RECORDING MEDIA AND OPTICAL DISK, DISK HAVING SPECIFIC DATA SO THAT A VISIBLE PATTERN OF CHARACTERS OR GRAPHICS APPEAR ON A COPY DISK

[75] Inventors: Ryuichi Koike, Yokohama; Hiroshi Banno, Koshigaya; Tamotsu Ito, Ayase; Takashi Takeuchi, Fujisawa, all of Japan

[73] Assignee: Hitachi, Ltd., Tokyo, Japan

[21] Appl. No.: 420,656

[22] Filed: Apr. 12, 1995

[30] Foreign Application Priority Data

| Apr. 26, 1994 | [JP] | Japan | 6-088747 |
| Apr. 26, 1994 | [JP] | Japan | 6-088748 |
| Apr. 26, 1994 | [JP] | Japan | 6-088749 |

[51] Int. Cl.$^6$ ............ G11B 13/00; G11B 5/86; H04L 9/00
[52] U.S. Cl. ............ 369/14; 370/273; 370/84; 360/15; 364/786.6; 380/4; 380/25
[58] Field of Search ............ 369/14, 83–84, 369/273, 280, 282, 290; 360/15; 364/286.6; 380/4, 25

[56] References Cited

U.S. PATENT DOCUMENTS

| 4,677,604 | 6/1987 | Selby et al. . | |
| 4,872,151 | 10/1989 | Smith | 369/14 |
| 4,967,286 | 10/1990 | Nomula et al. | 358/342 |
| 5,136,560 | 8/1992 | Hangai et al. | 369/32 |
| 5,138,604 | 8/1992 | Umeda et al. | 369/103 |
| 5,398,231 | 3/1995 | Shin et al. | 369/273 |
| 5,452,282 | 9/1995 | Abraham | 369/273 |

FOREIGN PATENT DOCUMENTS

| A-0 553 545 | 10/1992 | European Pat. Off. . | |
| A-2 640 794 | 12/1988 | France . | |
| 37 20 233 A1 | 12/1988 | Germany . | |
| A-60 193 143 | 10/1985 | Japan . | |
| A-02 179 941 | 7/1990 | Japan . | |
| A-04 286 768 | 10/1992 | Japan . | |
| 5-33470 | 5/1993 | Japan . | |
| A-05-44927 | 11/1993 | Japan . | |
| A-02-20884 | 2/1996 | Japan . | |
| A-2 250 626 | 10/1992 | United Kingdom | 369/273 |

*Primary Examiner*—Frank G. Font
*Assistant Examiner*—Jason D. Vierra Eisenberg
*Attorney, Agent, or Firm*—Fay Sharpe Beall Fagan Minnich & McKee

[57] ABSTRACT

A character and/or graphics pattern area for recording specific data is provided on a CD-ROM. When an original disk is prepared, a specific pit pattern corresponding to the specific data is recorded at a first predetermined tracking linear velocity controlled by a specific tracking linear velocity control system for each track so that a character and/or graphics pattern cannot be identified. When a copy disk is produced from the original disk, if data is recorded at a second tracking linear velocity controlled by a specific tracking linear velocity control system, the character and/or graphics pattern of visible size appears on the copy disk because of an optical reflection factor difference between areas caused by placement of the specific pit pattern corresponding to the specific data.

43 Claims, 10 Drawing Sheets

DISK SUBSTRATE

CARD ROTATION TYPE

HEAD ROTATION TYPE

CARD RECIPROCATING TYPE

BEAM SCAN TYPE

INFORMATION RECORDING MEDIA AND OPTICAL DISK, DISK HAVING SPECIFIC DATA SO THAT A VISIBLE PATTERN OF CHARACTERS OR GRAPHICS APPEAR ON A COPY DISK

BACKGROUND OF THE INVENTION

1. Field of the Invention

This invention relates to information recording media for recording information according to an optical characteristic, such as optical disks and optical cards and in particular to information recording media enabling identification of unauthorized copies of authorized optical disks, etc., produced by publishers holding copyrights.

2. Description of the Related Art

CD-ROM (compact disk read-only memory), one type of optical disk, is a typical information recording media to which an optical characteristic is imparted for recording information.

Most CD-ROMs adopt a CLV (constant linear velocity) system which records data using pits spaced at constant intervals. The CLV system can provide a larger data capacity for CD-ROM than a CAV (constant angular velocity) system which records data using pits spaced at intervals determined in response to the diametric position so that the angle to the center of the CD-ROM is always constant. CD-ROM uses frames as recording units in both of the CLV and CAV system. As shown in FIG. 16, a frame 1 is constituted with a synchronizing signal 2 followed by fixedlength data.

The CLV and CAV systems can also be mixed on one optical disk.

For example, in the art described in Japanese Utility Model Publication (KOKOKU) No. Hei 5-44927, an optical disk is provided with a CLV system recording area and a CAV system recording area in which still picture data, etc., is recorded. In the art described in Japanese Patent Publication (KOKOKU) No. Hei 5-33470, a CLV system recording area and a CAV system recording area are provided and the recording area locations are recorded as address information which is used for switching disk motor rotation control between the CLV and CAV system recording areas.

At present, CD-ROMs are widely used for recording digital data, such as software products, document data, and image data. Digital data such as software products and document data recorded on CD-ROMs is usually protected against unauthorized duplication under copyrights. However, up to now unauthorized CD-ROM copy production and sale have not been eradicated.

Particularly, unauthorized copies are often produced in an organized manner in the fields of gaming software products and electronic publications such as books and dictionaries, with normal commercial transactions being hindered.

Such copy disks of optical disks such as CD-ROM can be produced by using a plastic material, etc., for making a template of the form of a pit arrangement recorded on the information recording face of an optical disk and using the template for producing a master disk of the optical disk for unauthorized copying. However, in the template making technique, the template needs to be made by removing the protective film of the optical disk in order to expose the pit arrangement face, thus the pit form is often impaired during the process of removing the protective film and accurate copy disks cannot be produced. Particularly, it is extremely difficult to produce copy disks of optical disks formed with strong protective films.

In this case, data on an authorized optical disk is usually read, and the read data is used to produce a master disk of the optical disk for unauthorized copying in the same way that an authorized master disk is produced.

On the other hand, to prevent production of such copy disks of optical disks, hitherto, copyrights have been indicated by inscribing or printing characters, graphics, etc., on the surface of an optical disk.

The following arts are known as related arts for determining whether or not optical disks are unauthorized copy disks.

For example, the art described in Japanese Patent Laid-Open No. Hei 4-286768 is known as an art using the fact that the above-mentioned synchronizing signal 2 cannot normally be read as data. In the art, a part of the synchronizing signal 2 is replaced with another signal during recording and the existence of the replacement signal is particularly detected at the time of reproduction. If the replacement signal does not exist, the optical disk is determined to be an unauthorized copy disk.

An art forming a visible pattern on the surface of a signal recording layer of an optical disk is disclosed in Japanese Utility Model Laid-Open No. Hei 2-20884. An art forming a pattern, etc., that can be visually checked by changing the pit form on the signal face of an optical disk is disclosed in Japanese Patent Laid-Open No. Hei 2-179941.

According to the art described in Japanese Patent Laid-Open No. Hei 4-286768, the synchronizing signal 2 itself containing the replacement signal can be reproduced, thus it is not too difficult to produce an unauthorized copy disk of an optical disk on which the synchronizing signal 2 containing the replacement signal is recorded.

According to the arts described in Japanese Utility Model Laid-Open No. Hei 2-20884 and Japanese Patent Laid-Open No. Hei 2-179941, it is necessary to involve another step of forming characters, graphics, etc., in addition to the usual production process of a master disk of optical disks.

SUMMARY OF THE INVENTION

It is therefore an object of the invention to provide an information recording medium of which an original version can be produced in a production process similar to a conventional process and which enables an identifiable character and/or graphics pattern invisible on the original version to appear on an information recording medium of an unauthorized copy version produced from the original version for easily recognizing that it is an unauthorized copy version as the appearance changes therebetween.

To this end, according to the invention, there is provided an information recording medium comprising a recording surface for recording information according to a pit pattern formed on a plurality of tracks corresponding to record data, the information recording medium having a pattern recording area for recording specific data at a predetermined tracking linear velocity for each track on the plurality of tracks, wherein when the specific data is recorded on a different information recording medium at a tracking linear velocity different from the predetermined tracking linear velocity, the data provides, on the different information recording medium, a character and/or graphics pattern of visible size because of a light reflection factor difference between areas caused by placement of a specific pit pattern corresponding to the specific data.

According to the invention, there is provided an information recording medium comprising a recording surface for recording information according to a pit pattern formed on a plurality of tracks corresponding to record data, the information recording medium having a pattern recording area for recording specific data, wherein the data provides a character and/or graphics pattern, inclined to such a degree that the pattern cannot be visually identified, because of a light reflection factor difference between areas caused by placement of a specific pit pattern corresponding to the specific data and wherein two pits corresponding to a pit on the track on which the specific pit pattern is formed, and a pit on a contiguous track placed vertically to a tracking direction, are placed deviating from each other in the track direction with respect to the vertical direction on the two contiguous tracks.

According to another form of the invention, there is provided an information recording medium having a pattern recording area for recording specific data at a tracking linear velocity controlled by a CLV (constant linear velocity) system for recording data at constant tracking linear velocity on a plurality of tracks, and wherein when the specific data is recorded on a different information recording medium at a tracking linear velocity controlled by a CAV (constant angular velocity) system for recording data at constant rotation speed, the data provides, on the different information recording medium, a character and/or graphics pattern of visible size because of a light reflection factor difference between areas caused by placement of a specific pit pattern corresponding to the specific data.

According to a further form of the invention, there is provided an information recording medium having a pattern recording area for recording specific data at a first tracking linear velocity predetermined by a specific tracking linear velocity control system for each track on a plurality of tracks, wherein when the specific data is recorded on a different information recording medium at a second tracking linear velocity different from the first tracking linear velocity by the specific tracking linear velocity control system, the data provides, on the different information recording medium, a character and/or graphics pattern of visible size because of a light reflection factor difference between areas caused by placement of a specific pit pattern corresponding to the specific data.

According to the information recording medium of the present invention, when data on an original is recorded on a different information recording medium at a tracking linear velocity different from a predetermined tracking linear velocity, a character and/or graphics pattern, can be made to appear on the different information recording medium according to placement of a specific pit pattern corresponding to specific data.

The tracking linear velocity for each track is controlled by the CAV system for recording data at constant rotation speed, for example, on an original disk, and is controlled by the CLV system for recording data at constant tracking linear velocity on a copy disk. In such a case, pits are placed on the original disk so that the angle, which a line connecting two pits forms with respect to the tracking direction, becomes about 9 degrees.

According to the information recording medium of the present invention, when data is recorded on an original disk under the control of the CLV system for recording data at constant tracking linear velocity and on a copy disk under the control of the CAV system for recording data at constant rotation speed, a character and/or graphics pattern can be made to appear on the copy disk according to placement of a specific pit pattern corresponding to specific data.

For example, pits are placed on the original disk so that the angle, which a line connecting the two pits forms with the tracking direction, becomes about 171 degrees.

Further, according to the information recording medium of the present invention, when data is recorded on an original disk at a first predetermined tracking linear velocity controlled by a specific tracking linear velocity control system for each track and on a copy disk at a second tracking linear velocity controlled by a specific tracking linear velocity control system, a character and/or graphics pattern can be made to appear on the copy disk according to placement of a specific pit pattern corresponding to specific data.

For example, two pits corresponding to a pit on the track on which the specific pit pattern is formed and a pit on a contiguous track placed vertically to a tracking direction on a copy disk are placed deviating from each other in the track direction with respect to the vertical direction on the two contiguous tracks on an original disk. Placement of the specific pit pattern shifts due to the tracking linear velocity difference for each track between the original and copy disks, causing a character and/or graphics pattern to appear on the copy disk.

DESCRIPTION OF THE PREFERRED EMBODIMENTS

Referring now to the accompanying drawings, there are shown preferred embodiments of information recording media according to the invention, by taking CD-ROM, one type of optical disk, as an information recording medium example. Hereinafter, a CD-ROM produced from a master disk will be referred to as an original disk and a CD-ROM produced by copying the original disk will be referred to as a copy disk.

First, a principle of making a character and/or graphics pattern visible on a copy disk according to stored data on an original disk will be discussed, then a principle of enabling the character and/or graphics pattern to be made invisible on the original disk will be described in the following embodiments.

Figure 1:
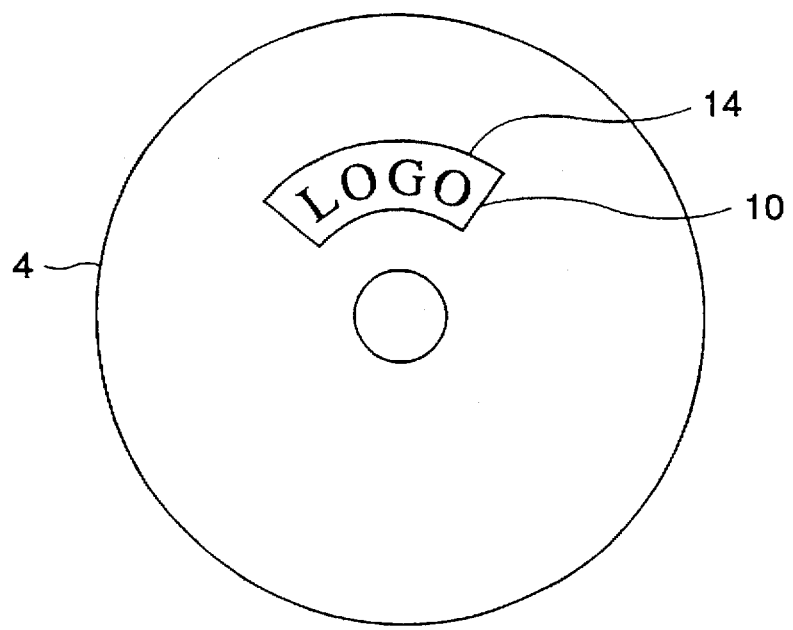
FIG. 1 is an external view of a CD-ROM in the invention.

FIG. 1 shows the signal side of a CD-ROM 4 of a copy disk in the invention. A visible character and/or graphics pattern 10, as shown in FIG. 1, appears on the signal side of the CD-ROM 4 of a copy disk. The character and/or graphics pattern 10 can represent the copyrights of data and/or programs stored on the CD-ROM, a trademark of data stored on the CD-ROM or the CD-ROM itself, or other rights to data stored on the CD-ROM or the CD-ROM itself. Of course, it can also represent any other contents. The character and/or graphics pattern 10 is formed in a character and/or graphics pattern area 14.

The principle of making a character and/or graphics pattern visible will be discussed.

First, how data is recorded on the signal side of the CD-ROM will be described.

For example, on the CD-ROM, data is modulated by an EFM (eight to fourteen modulation) system used for music CDs and recorded on the signal side using the CLV system.

That is, 8-bit data items listed under the left column of Table 1 are converted into 14-bit EFM channel bit patterns listed under the right column. Three margin bits are added to them to generate 17-bit channel bit patterns, which are used as record units on the CD-ROM.

TABLE 1

| Data | EFM channel bit pattern | |
|---|---|---|
| 000 | 01001000100000 | |
| 001 | 10000100000000 | |
| 002 | 10010000100000 | |
| . | | |
| . | | |
| . | | |
| 088 | 01001000000100 | |
| 089 | 10000000000100 | 11-T pattern |
| 090 | 10010000000100 | |
| . | | |
| . | | |
| . | | |
| 167 | 00100100001001 | |
| 168 | 01001001001001 | 3-T pattern |
| 169 | 10000001001001 | |
| . | | |
| . | | |
| . | | |
| 255 | 00100000010010 | |

Figure 2:
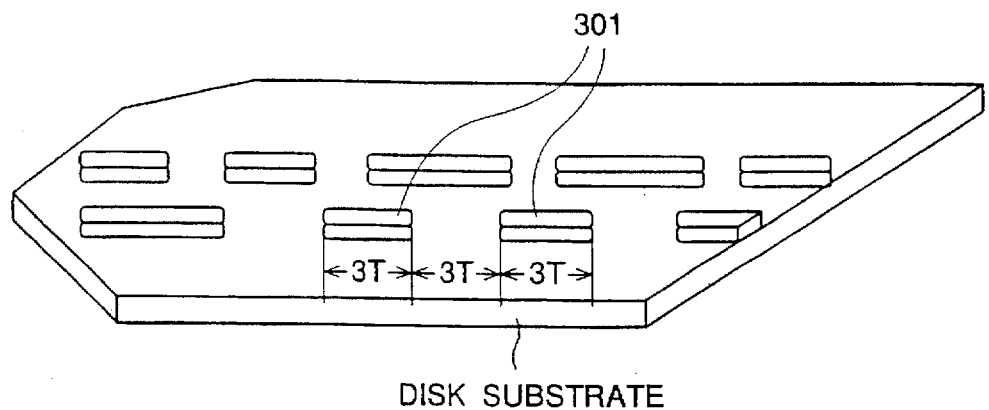
FIG. 2 is an illustration showing the form of a pit pattern of the CD-ROM in the invention.

Next, each channel bit pattern is converted into an arrangement of small projections (pits) each having a predetermined width and height for being recorded on the optical disk, as shown in FIG. 2. The pits may be small recesses each having a predetermined width and depth.

At this time, data "1" of the channel bit pattern corresponds to the edge of each pit. For example, the 8-bit data "168" listed in Table 1 is converted into EFM channel bit pattern "01001001001001," thus data "1" appears every three bits. Therefore, assuming that the pit length corresponding to one channel bit is T, the pit pattern corresponding to the 8-bit data "168" contains two pits each having a length of 3T spaced 3T apart.

On the other hand, likewise, the pit pattern corresponding to the data "89" contains a pit 11T long. In the EFM modulation system listed in Table 1, the shortest pit length is 3T and the longest pit length is 11T.

On the optical disk, a light reflection film such as an aluminum thin film is deposited on the full faces of pit portions and non-pit portions (land portions), and the difference between light reflection factors from the pit and non-pit portions is detected to reproduce data.

In the following embodiments of the invention, the reflection factor difference is used to form a visible character and/or graphics pattern on the optical disk.

That is, the average light reflection factor varies from one pit pattern to another from the reflection factor difference between pit and non-pit portions. Then, one pit pattern is collected in the form of a desired character and/or graphics pattern and a different pit pattern is placed outside the character and/or graphics pattern.

In the following embodiments, the pit patterns corresponding to the 8-bit data "168" and "89" are used.

Figure 3:
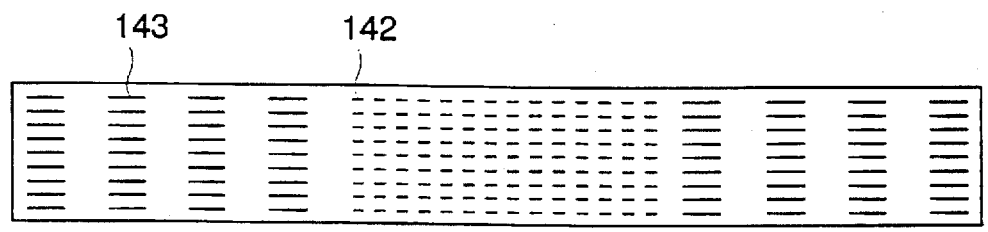
FIG. 3 is an illustration showing pit patterns of the CD-ROM in the invention.

FIG. 3 is an enlarged view of a part of the character and/or graphics pattern on the signal side of the CD-ROM. Data and a synchronous pattern, error correction information, etc., make up a frame, and a pit pattern is prepared for the frame. Therefore, in fact, a bit pattern corresponding to channel bits of the synchronous pattern and error correction information appears between bit patterns corresponding to the data. However, the percentage of the bit patterns corresponding to channel bits to those corresponding to data is small. Therefore, for simplicity, FIG. 3 assumes that a frame consists of only a pit pattern corresponding to data. Pit patterns corresponding to the margin bits are also omitted.

In the illustration, one of the character and/or graphics pattern 10 and its periphery shown in FIG. 1 is made of a pit pattern corresponding to the data "168" containing pits 142 each 3T long and the other is made of a pit pattern corresponding to the data "89" containing pits 143 each 11T long, because the shortest pit length is 3T and the longest pit length is 11T in the EFM modulation system as described above and the reflection factor difference between both these pit patterns is the largest. For example, in the example shown in FIG. 1, the "LOGO" portion of the character and/or graphics pattern 10 is made of pits each 3T long and the remaining portion in the character and/or graphics pattern area 14 is made of pits each 11T long.

They may be made of two types of pit patterns corresponding to another data combination providing other pit patterns having a reflection factor difference which introduce no problem with visibility. Only one of a character and/or graphics pattern and its periphery may be made of a pit pattern corresponding to specific data, preferably data with the corresponding pit pattern having a higher or lower reflection factor than the average and the other may be made of a pit pattern set corresponding to a random data set, because pits have extremely small on visibility and a pit pattern set corresponding to a random data set is considered to indicate an average reflection factor as a set. One of the inside and outside of a character and/or graphics pattern may be made of pit patterns corresponding to a combination of specific data. Both of the inside and outside of a character and/or graphics pattern may be made of pit patterns corresponding to different combinations of specific data.

Thus, a character and/or graphics pattern can be formed using pit patterns corresponding to normally used data. Conversely, character and/or graphics patterns are formed by recording normal data during copying.

When a character and/or graphics pattern is recorded on an original disk of an optical disk, for example, an encoder attached to a spindle motor of the disk or any other measuring means is used for controlling the pattern to a predetermined record position.

Thus, CD-ROM on which a character and/or graphics pattern is formed is prepared during copying, regardless of whether the CLV or CAV system is used.

Next, the principle of enabling the character and/or graphics pattern to be made invisible on the original disk will be discussed in the following embodiments.

A first embodiment of the invention will be discussed.

In the first embodiment, when reproduction signals are read from a CLV system optical disk (original disk) produced by a publisher having the copyrights and a copy disk is produced in the CLV system, a character and/or graphics pattern appears on the copy disk. As the character and/or graphics pattern, for example, a message or the like to the effect that this disk is an unauthorized copy disk is indicated in addition to a pattern representing the copyrights to the information stored on the CD-ROM and a pattern representing a trademark given to the CD-ROM or the data stored thereon or any other rights, as described above.

In the first embodiment, the pattern area is recorded in the CAV system and data portions other than the pattern area are recorded in the CLV system and when all are copied in the CLV system, the character and graphics pattern appears on the copy disk. Therefore, whether or not the optical disk is an original or copy disk can be determined at a glance according to whether or not the character and/or graphics pattern exists.

First, the reason why the character and/or graphics pattern is invisible on the original disk and becomes visible on the copy disk will be discussed.

Figure 4:
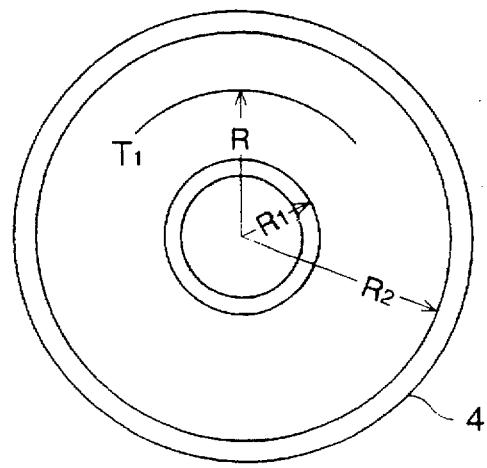
FIG. 4 is an illustration showing track radius positions of the CD-ROM in the invention.
Figure 5A:
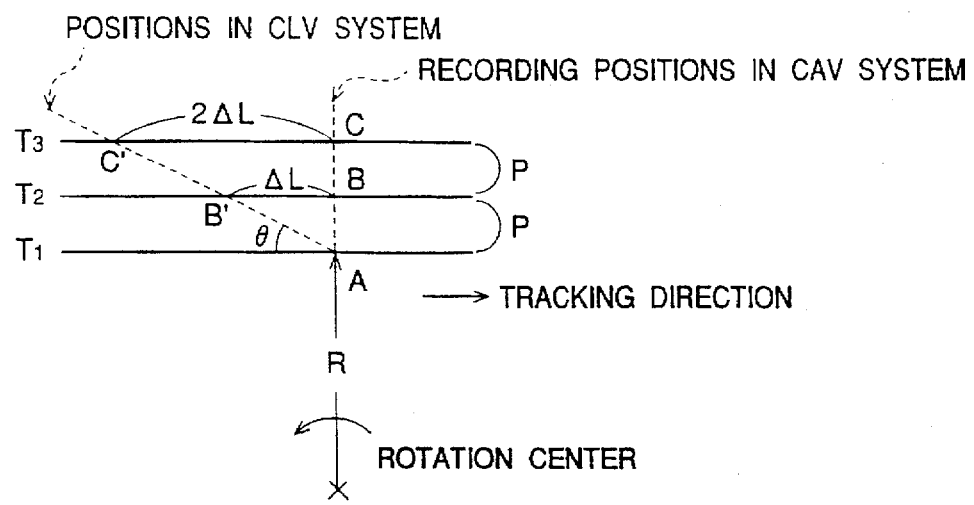
FIGS. 5A and 5B are illustrations showing the pit position relationship for each track of CD-ROM according to a first embodiment of the invention.
Figure 5B:
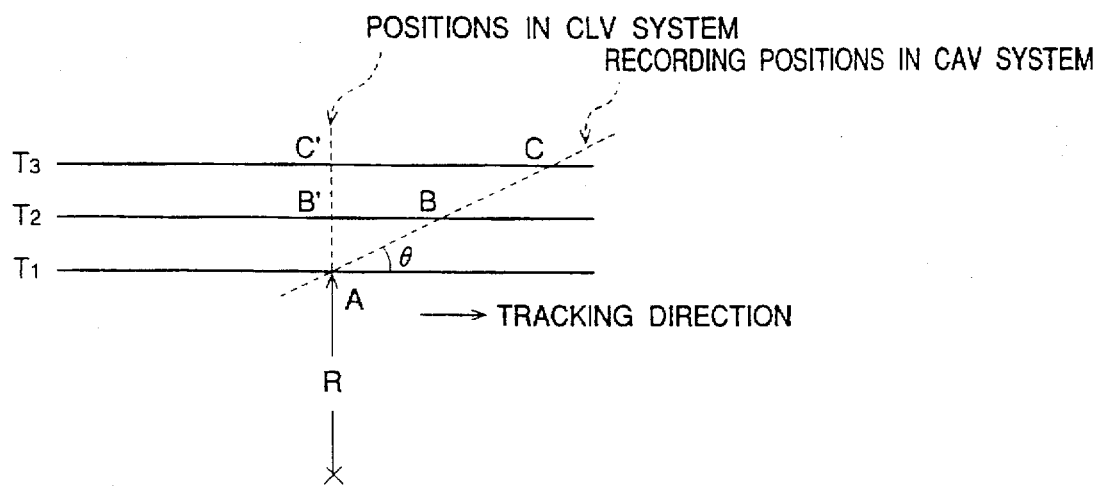

FIG. 4 is an illustration for explaining the radius of the CD-ROM. FIGS. 5A and 5B are enlarged views of tracks on the CD-ROM showing the pit position relationships among three tracks $T_1$, $T_2$, and $T_3$ contiguous to each other. Points A, B, and C in FIG. 5A, which are pit positions on the tracks $T_1$, $T_2$, and $T_3$ respectively, are in line in a vertical direction (radial direction), making up the contour of the character and/or graphics pattern. When the pits are in line in the vertical direction (radial direction) or are inclined to a certain degree, the character and/or graphics pattern becomes visible. When the pits exist at positions inclined in the radial direction and the inclination angle falls below a specific value, the character and/or graphics pattern becomes invisible.

Assuming that R is the rotation radius of the track $T_1$ and that p is a track pitch, when data is recorded in the CAV system, the length of the track $T_1$ is $2\pi R$, that of the track $T_2$ is $2\pi(R+p)$, and that of the track $T_3$ is $2\pi(R+2p)$; the track length sequentially increases by $2\pi p$. In the CAV system, the data record capacities for the track lengths $2\pi R$, $2\pi(R+p)$, and $2\pi(R+2p)$ are equal, but in the CLV system, the data record capacities every $2\pi R$, for example, are equal. Therefore, if the reproduction signals of the original disk are used to produce a CLV system copy disk, the CAV system character and/or graphics pattern area is copied in the CLV system, thus the position relationships among the points A, B, C, etc., change. If this state is shown with the point A as the reference, the point B moves to point B' delayed by the one track length difference $\Delta L=2\pi p$ and the point C moves to point C' delayed by $2\Delta L$, as shown in FIG. 5A.

FIG. 5B is provided by rewriting the position relationships in FIG. 5A so that the points A, B', and C' are in line in the vertical direction. Assuming that the angle which the line ABC forms with the track direction is θ in FIG. 5B, the contour A, B, C of the character and/or graphics pattern inclined by angle θ and recorded on the original disk is in line in the vertical direction like the points A, B', C' on the copy disk. This means that if the character and/or graphics pattern inclined by angle θ with the tracking direction and recorded on the original disk in the CAV system is copied in the CLV system, it becomes vertical on the copy disk.

The angle θ is given by the following expression (1) and becomes about 9 degrees independently of the track pitch p, linear velocity, etc,:

$$\theta = \tan^{-1}(p/\Delta L) = \tan^{-1}(1/2\pi) = 9.04 \text{ degrees} \quad (1)$$

Since this inclination is almost close to the horizontal, it is difficult to visually identify the character and/or graphics pattern on the original disk; in fact, the pattern is invisible. Since the character and/or graphics pattern becomes vertical on the copy disk, it can be visually identified.

The embodiment uses the principle for inclining the character and/or graphics pattern at $\tan^{-1}(1/2\pi) \approx 9$ degrees with the tracking direction and records the pattern on a CLV system original disk in the CAV system.

Although the tracks $T_1$, $T_2$, $T_3$, etc., are found as approximations to true circles in the description, the tracks are formed as a spiral on actual CD-ROM, thus the length of each track differs slightly from the above-mentioned values. As a result, the character and/or graphics pattern on the copy disk becomes somewhat contorted, and this contortion may be removed by correcting the difference in each track length on the spiral track before recording.

Next, when a master disk of original disks is produced, at what tracking linear velocity a character and/or graphics pattern area should be recorded will be discussed.

To make a character and/or graphics pattern invisible on an original disk and visible on a copy disk when inclination angle θ is about 9 degrees, the tracking linear velocity in CLV system copying needs to match any of the tracking linear velocities in the CAV area of the original disk.

In FIGS. 5A and 5B, the tracking linear velocities of the original and copy disks match at point A of track $T_1$. Since the track $T_1$ may be any track in the CAV system character and/or graphics pattern area, the tracking linear velocity in CLV system copying needs only to match any of the tracking linear velocities in the CAV system recording area.

Thus, in the embodiment, the tracking linear velocity during copying is placed within the tracking linear velocity range of the CAV system recording area of the original disk.

Figure 14A:
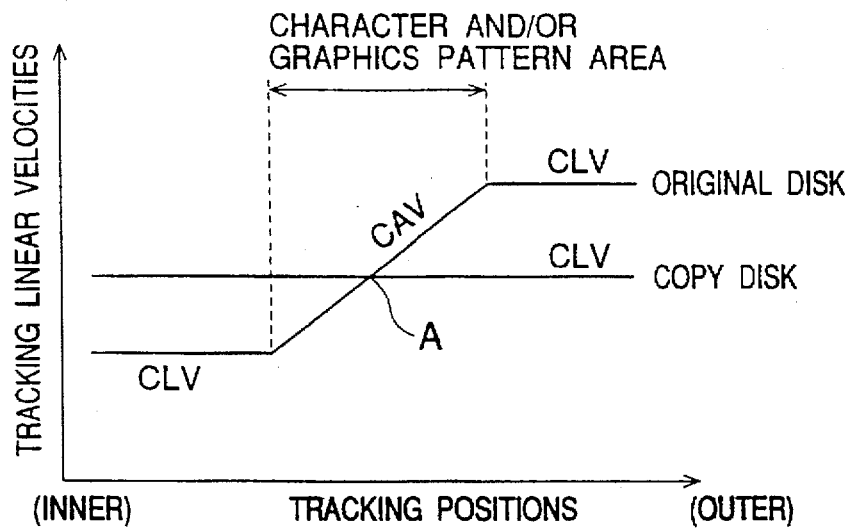
FIGS. 14A and 14B are illustrations showing the relationships between tracking positions and tracking velocities of the CD-ROM according to the first embodiment of the invention.
Figure 14B:
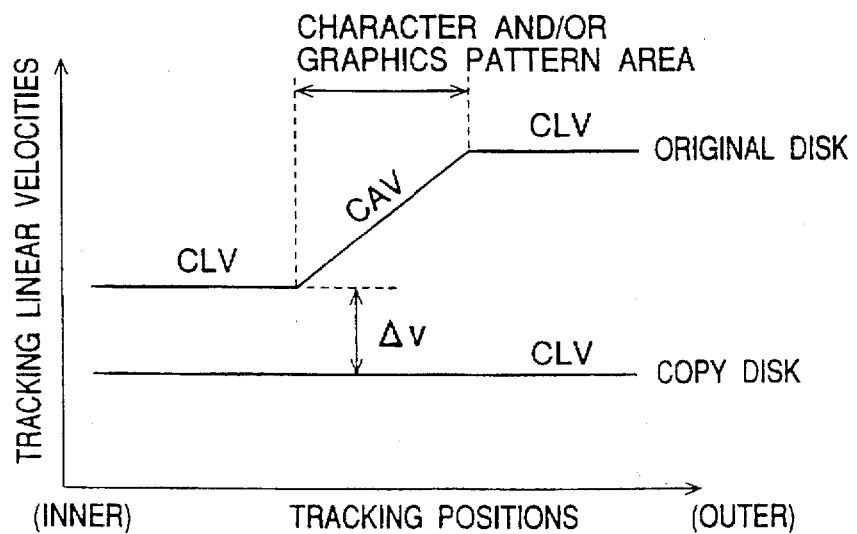

FIGS. 14A and 14B are illustrations showing the relationships between the tracking positions and tracking linear velocities when original and copy disks are produced. The tracking positions are indicated on the horizontal axis and the tracking linear velocities are indicated on the vertical axis. In the CAV system, the tracking linear velocity increases from inner side to outer peripheral surface of the disk. Therefore, the tracking linear velocity of the original disk increases in the character and/or graphics pattern area, leading to the tracking linear velocity in the flat CLV area, a data recording area of the CD-ROM. If the tracking linear velocity of the copy disk recording the reproduction signals of the original disk in the CLV system lies within the tracking linear velocity range of the CAV area of the original disk, as shown in FIG. 14A, the character and/or graphics pattern will appear on the copy disk.

In contrast, if the tracking linear velocities of the original and copy disks do not cross each other as shown in FIG. 14 B, the tracking linear velocity during copying shifts by at least $\Delta v$ shown in FIG. 14 B from the tracking linear velocity in the CAV area of the original disk, and it is feared that the character and/or graphics pattern on the copy disk may be deformed due to the $\Delta v$ and become difficult to identify.

Figure 15:
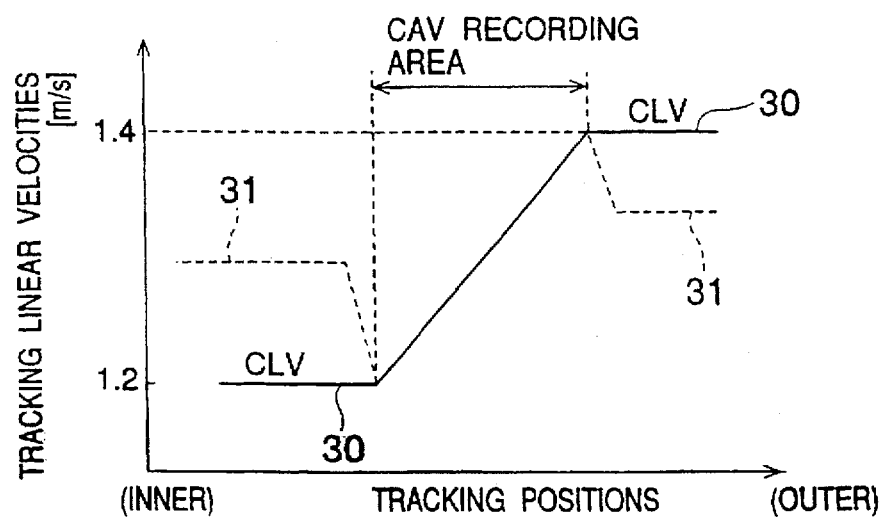
FIG. 15 is an illustration showing the relationships between tracking positions and tracking velocities of the CD-ROM according to the first embodiment of the invention.
Figure 16:
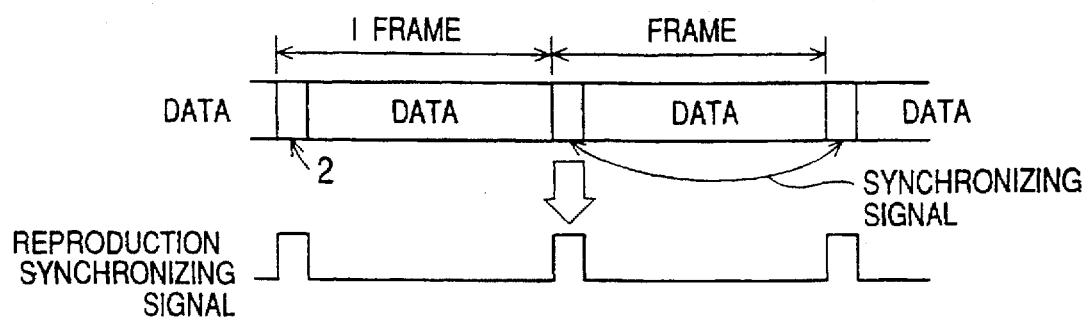
FIG. 16 is an illustration showing frames recorded on CD-ROM.

FIG. 15 is an illustration showing the relationship between the tracking positions and tracking linear velocities of CAV areas and CLV system data recording area of original disk of CD.

In FIG. 15, characteristic 30 indicates a characteristic when the tracking linear velocity range of the CAV recording area is 1.2–1.4 m/s, an allowable linear velocity range specified in the CD standard, and both ends of the area are connected to CLV areas with tracking linear velocities 1.2 m/s and 1.4 m/s. Characteristic 31 indicates a characteristic when the tracking linear velocities of the CLV areas connected to both ends of the CAV recording area are narrowed a predetermined width at a time from 1.2–1.4 m/s.

In either case, since the tracking linear velocities of the CLV areas lie within the linear velocity range of the CAV area, the character and/or graphics pattern appears on a copy disk. However, to produce the CD stably, it is more practical to place the tracking linear velocities of both CLV areas within the CD specification range like the characteristic 31 because the tracking linear velocities of both CLV areas are not placed beyond the specification range.

Next, the recording position of the character and/or graphics pattern in the first embodiment will be discussed.

First, the radial width of the CAV recording area, namely, character and/or graphics pattern area on the original disk is found.

As described above, the length of the track $T_1$ shown in FIG. 5B is $2\pi R$ and the length of the outer track $T_2$ is $2\pi(R+p)$. Therefore, the tracking linear velocity increase ratio of the track $T_2$ to $T_1$ becomes as shown in Expression (2):

$$2\pi(R+p)/(2\pi R)=1+p/R \qquad (2)$$

Therefore, the tracking linear velocity increase ratio of the nth track $T_n$ to the track $T_1$ becomes as shown in Expression (3) providing the rotation radius ratio between the tracks $T_1$ and $T_n$:

$$2\pi(R+np)/(2\pi R)=1+np/R \qquad (3)$$

np in Expression (3) is the width of the tracks $T_1$ to $T_n$, and thus corresponds to the width of the character and/or graphics pattern area.

On the other hand, the tracking linear velocity range allowed for CLV system CD-ROM is 1.2–1.4 m/s. Since the tracking linear velocity when the original disk is copied in the CLV system is also set within the allowable range, the tracking linear velocity increase ratio of the character and/or graphics pattern area of the original disk shown in Expression (3) may be matched with the linear velocity range. That is, if the tracking linear velocity increase ratio in the tracking linear velocity range is found from Expression (3), the following relationship is true:

$$1+np/R=1.4(m/s)/1.2(m/s)=1.17 \qquad (4)$$

Thus, the character and/or graphics pattern area width np is given by Expression (5):

$$np=0.17R \qquad (5)$$

Figure 9A:
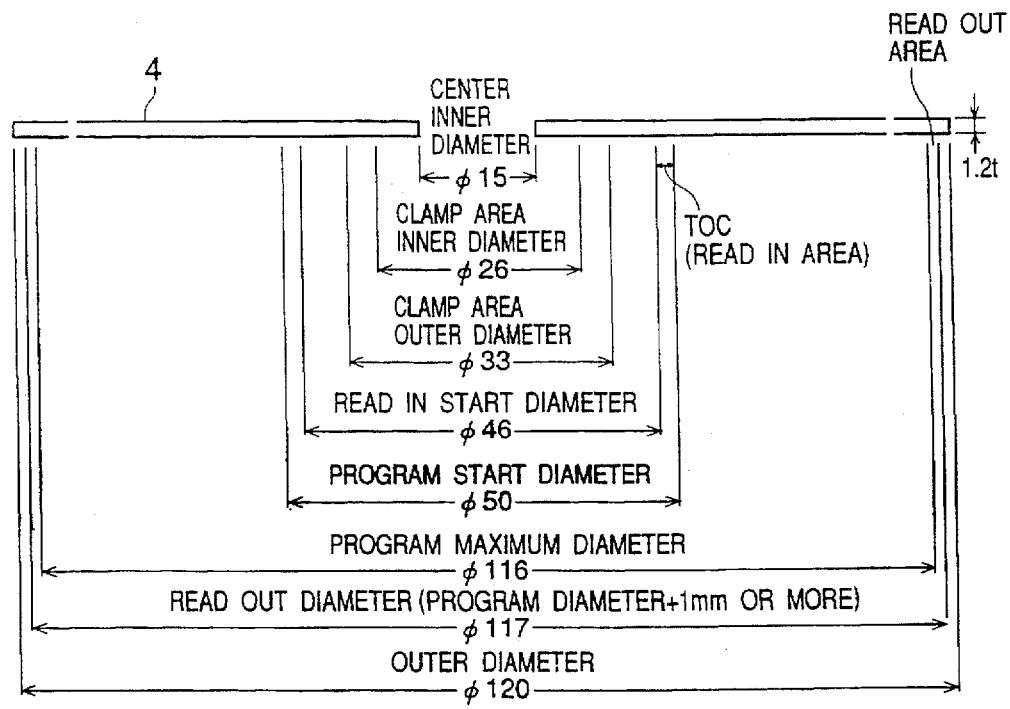
FIGS. 9A to 9C are illustrations showing layout of character and/or graphics pattern area, and a mirror portion of CD-ROM in the invention.
Figure 9B:
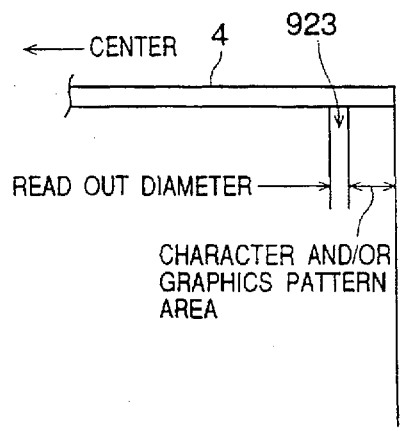
Figure 9C:
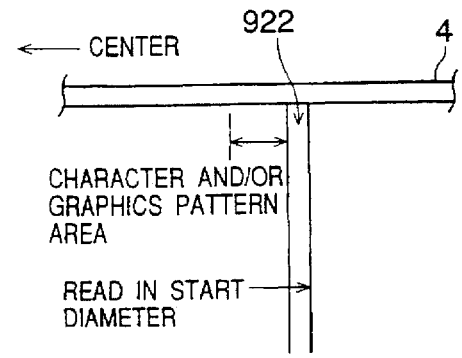

Expression (5) means that the character and/or graphics pattern area width np needs to be increased in proportion to the radius R of the track $T_1$ of the original disk. Therefore, as the character and/or graphics pattern area is provided on the outer peripheral side of the original disk, the wider width np is required, but the width np may be the extent to which the character and/or graphics pattern can be well identified. Thus, the character and/or graphics pattern area can be placed in optical disk as described below:

FIGS. 9A to 9C are sectional views of a CD used for a CD-ROM, etc. In FIG. 9A, data is recorded from the position of the program start diameter (Ø50 (mm), hereinafter units omitted) to the position not exceeding the program maximum diameter (Ø116) in sequence in the outer peripheral direction. Therefore, when the data amount is small, the outer diameter of a program area becomes the inside of the program maximum diameter and is called the program out diameter. A read out area in which "0" data is recorded is provided outside the program out diameter.

TOC (table of contents) for recording data index information, etc., in the program area is provided between the read in start diameter (Ø46) and the program start diameter, and is called a read in area. Normally, both the inside of the read in area and the outside of the read out area are made of a mirror. Since no pits exist on the mirror, an optical pickup cannot perform focusing nor tracking operations thereon.

If the character and/or graphics pattern area of the original disk is placed in the program area, the CD-ROM data storage capacity decreases. In the embodiment, the character and/or graphics pattern area is provided in at least either of the inside of the read in area or the outside of the read out area.

To write into the outside of the read out area, since the read out diameter is Ø117, it becomes necessary to make the program out diameter (117/(1+0.17)=Ø100) from Expression (5). As a result, the character and/or graphics pattern area encroaches into the program area, decreasing the CD-ROM data storage capacity.

In contrast, to place the character and/or graphics pattern area in the inside of the read in area, since the read in start diameter is Ø46, the inner diameter of the character and/or graphics pattern area becomes (46/(1+0.17)=Ø41). The value Ø41 is sufficiently outside the clamp area outer diameter Ø33 required to clamp the disk.

Therefore, a character and/or graphics pattern can be easily written into the inside of the read in area at a linear velocity ratio of 1.17 and the CD-ROM data storage capacity is not decreased. Since the difference between the read in start diameter Ø46 and the inner diameter Ø41 of the character and/or graphics pattern area is 5 mm, the character and/or graphics pattern area width becomes 2.5 mm, a reasonable width for clearly identifying characters and/or graphics.

Figure 11:
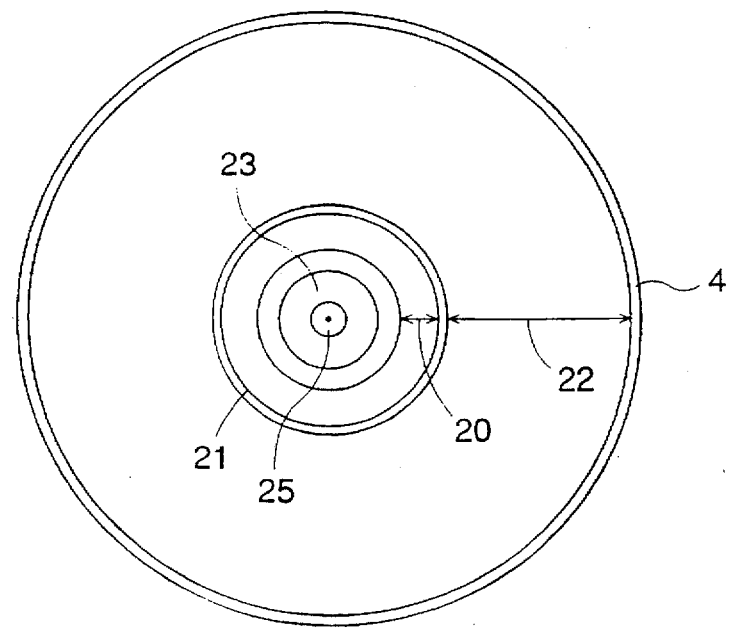
FIG. 11 is an illustration showing a character and/or graphics pattern area of the CD-ROM according to the first embodiment of the invention.

FIG. 11 is a top view of the CD with the character and/or graphics pattern area provided in the inside of the read in area, and FIG. 9C is a sectional view of the CD. As shown in FIG. 11, the character and/or graphics pattern area 20 of 2.5 mm wide is written into the inside of the read in area 21 and does not encroach into the program area 22 or clamp area 23. As shown in FIG. 9C, a thin mirror portion may be provided between the read in start diameter and the character and/or graphics pattern area 20.

As shown in FIG. 9B, if the read in area can be made sufficiently wide, a character and/or graphics pattern may be recorded in the read out area, needless to say.

When the data amount is small, a character and/or graphics pattern can also be recorded in the program area. When the data amount is small, more than one character and/or graphics pattern can be provided.

Thus, when a character and/or graphics pattern is inclined by an angle of about 9 degrees with the tracking direction and recorded in the predetermined character and/or graphics pattern area 20 in the CAV system and the portion of the character and/or graphics pattern area 20 is copied in the CLV system, the character and/or graphics pattern can be made to appear on the surface of the copy disk. Data may be recorded in the program area other than the character and/or graphics pattern area 20 of the original disk in the CAV system rather than the CLV system.

Next, a second embodiment of the invention will be discussed.

In the second embodiment, when reproduction signals are read from a CAV or CLV system optical disk (original disk) produced by a publisher having the copyrights and a copy disk is produced in the CAV system, a copyright character and/or graphics pattern appears on the copy disk. In the second embodiment, the pattern area is recorded in the CLV system and data portions other than the pattern area are recorded in the CAV or CLV system and when the pattern area is copied in the CAV system, the character and/or graphics pattern appears on the copy disk (other data portions are copied in the CAV or CLV system). Therefore, whether or not the optical disk is an original or copy disk can be determined at a glance according to whether or not the character and/or graphics pattern exists.

The reason why the character and/or graphics pattern is invisible on the original disk and becomes visible on the copy disk will be discussed.

Figure 6A:
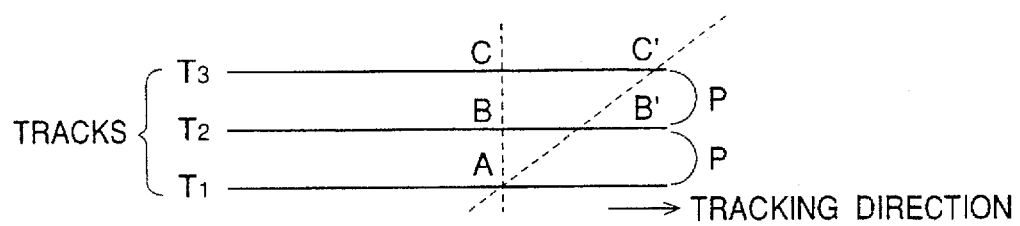
FIGS. 6A and 6B are illustrations showing the pit position relationship for each track of CD-ROM according to a second embodiment of the invention.
Figure 6B:
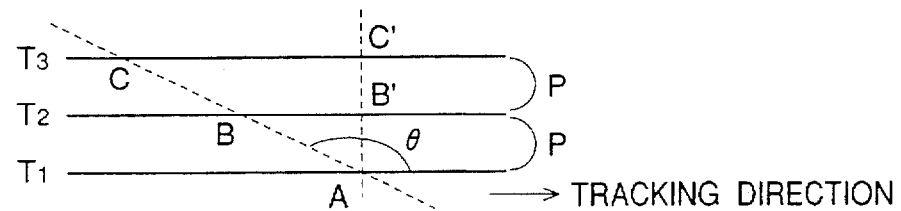

FIGS. 6A and 6B are partially enlarged views of tracks on an optical disk explaining the character and/or graphics pattern position relationship between original and copy disks. In FIGS. 6A and 6B, as in FIGS. 5A and 5B in the first embodiment, $T_1$, $T_2$, and $T_3$ denote three tracks, shown on an enlarged scale, contiguous to each other on the disk. In FIG. 6A, points A, B, and C, which are pit positions on the tracks $T_1$, $T_2$, and $T_3$ respectively, are in line in a vertical direction (radial direction), making up the contour of the character and/or graphics pattern. When the pits are in line in the vertical direction (radial direction) or are inclined to a certain degree, the character and/or graphics pattern becomes visible. When the pits exist at positions inclined in the radial direction and the inclination angle falls below a specific value, the character and/or graphics pattern becomes invisible.

Assuming that R is the rotation radius of the track $T_1$ and that p is a track pitch, the length of the track $T_1$ is $2\pi R$, that of the track $T_2$ is $2\pi(R+p)$, and that of the track $T_3$ is $2\pi(R+2p)$; the track length sequentially increases by $2\pi p$.

In the CLV system, the data record capacities every $2\pi R$, for example, are equal, but in the CAV system, the data record capacities for the track lengths $2\pi R$, $2\pi(R+p)$, and $2\pi(R+2p)$ are equal. Therefore, if the reproduction signals of the original disk are used to produce a CAV system copy disk, the CLV system character and/or graphics pattern is copied in the CAV system, thus the position relationships among the points A, B, C, etc., change. If this state is shown with the point A as the reference, the point B moves to point B' advanced by the one track length difference $\Delta L=2\pi p$ and the point C moves to point C' delayed by $2\Delta L$, as shown in FIG. 6A.

FIG. 6B is provided by rewriting the position relationships in FIG. 6A so that the points A, B', and C' are in line in the vertical direction. Assuming that the angle which the line BC forms with the tracking direction is $\theta$, the contour A, B, C of the character and/or graphics pattern inclined by angle $\theta$ and recorded on the original disk is in line in the vertical direction like the points A, B', C' on the copy disk. This means that the character and/or graphics pattern inclined by angle $\theta$ with the tracking direction and recorded on the original disk in the CLV system becomes vertical on the CAV system copy disk.

The angle $\theta$ is given by the following expression (6) and becomes about 171 degrees independently of the track pitch p, linear velocity, etc.:

$$\theta = 180 - \tan^{-1}(p/\Delta L) = 180 - \tan^{-1}(1/2\pi) \approx 171 \text{ degrees} \qquad (6)$$

Since this inclination is very close to the horizontal, it is difficult to visually identify the character and/or graphics pattern on the original disk; in fact, the pattern is invisible. Since the character and/or graphics pattern becomes vertical on the copy disk, it can be visually identified.

The embodiment uses the principle for inclining the character and/or graphics pattern at $180-\tan^{-1}(1/2\pi) \approx 171$ degrees with the tracking direction and recording the pattern on a CAV or CLV system original disk in the CLV system.

Although the tracks $T_1$, $T_2$, $T_3$, etc., are given as approximations to true circles in the description, the tracks are formed as a spiral on actual CD-ROM, thus the length of each track differs slightly from the above-mentioned values. As a result, the character and/or graphics pattern on the copy disk becomes somewhat contorted, and this contortion may be removed by correcting the difference in each track length on the spiral track before recording.

Next, when a master disk of original disks is produced, at what tracking linear velocity a character and/or graphics pattern area should be recorded will be discussed.

To make a character and/or graphics pattern which is invisible on an original disk visible on a copy disk when inclination angle $\theta$ is about 171 degrees, the tracking linear velocity in CAV system copying needs to match any of the tracking linear velocities in the CLV area of the original disk.

In FIGS. 6A and 6B, the tracking linear velocities of the original and copy disks match on track $T_1$. Since the track $T_1$ may be any track in the character and/or graphics pattern area, the tracking linear velocity of the character and/or graphics pattern area when the original disk is copied in the CAV system needs only to match any of the tracking linear velocities in the character and/or graphics pattern area of the original disk.

Figure 8:
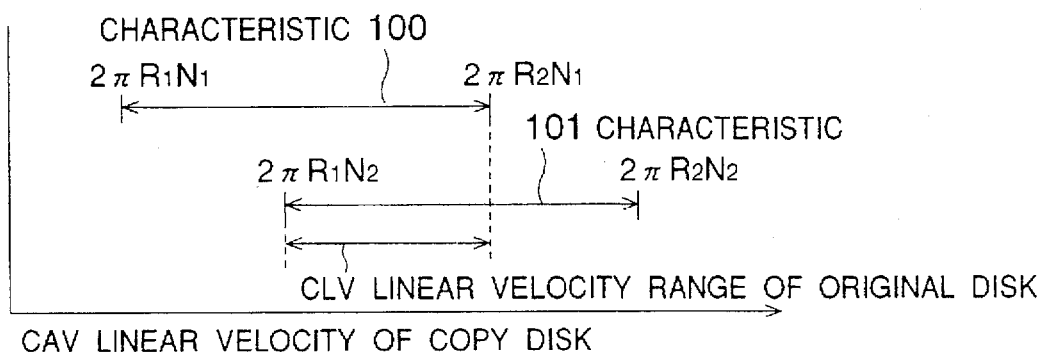
FIG. 8 is an illustration showing linear velocity characteristics of the CD-ROM according to the second embodiment of the invention.

That is, assuming that the rotation speed range allowed for optical disks in the CAV system is $N_1$–$N_2$ ($N_1 < N_2$) rps (revolutions per second) and that the radius of the character and/or graphics pattern area recorded on the original disk ranges from $R_1$ to $R_2$ ($R_1 < R_2$), the tracking linear velocity range in the radius $R_1$–$R_2$ area on an optical disk produced by copying the original disk at the rotation speed $N_1$ becomes like characteristic 100 shown in FIG. 8 and that on an optical disk produced by copying the original disk at the rotation speed $N_2$ becomes like characteristic 101.

Since copy disks are produced in the rotation speed range of $N_1$–$N_2$, if the tracking linear velocity of the character and/or graphics pattern area of the original disk is set within the range in which the characteristics 100 and 101 shown in FIG. 8 overlap each other, the tracking linear velocities of the copy and original disks always match anywhere in the character and/or graphics pattern area, and the character and/or graphics pattern which is invisible on the original disk becomes visible on the copy disk.

In FIG. 8, to provide the character and/or graphics pattern area of the original disk, the range in which the tracking linear velocity range characteristics 100 and 101 match needs to exist. Thus, the following relationship should be satisfied:

$$2\pi R_1 N_2 < 2\pi R_2 N_1$$

That is, $N_2/N_1 < R_2/R_1$ must be set. Thus, in the embodiment, the character and/or graphics pattern area radius ratio of the original disk ($R_2/R_1$) is set larger than the allowable rotation speed ratio of CAV system optical disk ($N_2/N_1$).

Next, the recording position of the character and/or graphics pattern in the second embodiment will be discussed with reference to FIGS. 9A to 9C.

If the character and/or graphics pattern area of the original disk is placed in the program area, the CD-ROM data storage capacity decreases. In the embodiment, the character and/or graphics pattern area is provided in at least either of the inside of the read in area or the outside of the read out area.

Assume that the allowable rotation speed ratio of optical disks in the CAV system ($N_2/N_1$) is 1.1. To write into the outside of the read out area, since the read out diameter is Ø117 as shown in FIG. 9A, the maximum program out diameter becomes (Ø117/1.1≈Ø106.4) and the character and/or graphics pattern area encroaches into the program area, decreasing the CD-ROM data storage capacity.

In contrast, to place the character and/or graphics pattern area in the inside of the read in area, since the read in start diameter is Ø46, the inner diameter of the character and/or graphics pattern area becomes (Ø46/1.1≈Ø42), which is sufficiently outside the clamp area outer diameter Ø33 required to clamp the disk.

Therefore, a character and/or graphics pattern can be easily written into the inside of the read in area at an allowable rotation speed ratio of 1.1 and the CD-ROM data storage capacity is not decreased.

Since the difference between the read in start diameter Ø46 and the inner diameter Ø42 of the character and/or graphics pattern area is 4 mm, the character and/or graphics pattern area width becomes 2 mm, a reasonable width for clearly identifying characters and/or graphics.

Figure 12:
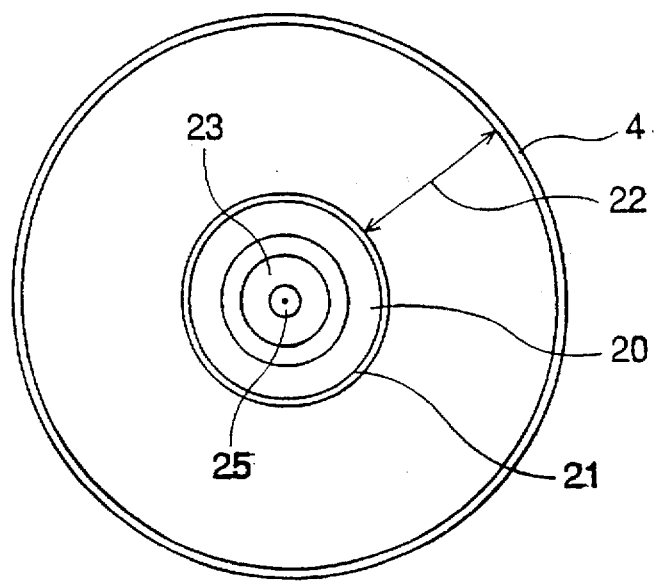
FIG. 12 is an illustration showing a character and/or graphics pattern area of the CD-ROM according to the second embodiment of the invention.

FIG. 12 is a top view of the CD with the character and/or graphics pattern pattern area provided in the inside of the read in area. As shown in FIG. 12, the character and/or graphics pattern pattern area 20 of 2 mm wide is written into the inside of the read in area 21 and does not encroach into the program area 22 or clamp area 23. A thin mirror portion may be provided between the read in start diameter and the character and/or graphics pattern area 20.

If the read out area or the outside thereof can be made sufficiently wide, a character and/or graphics pattern may be recorded in or outside the read out area, needless to say.

When the data amount is small, a character and/or graphics pattern can also be recorded in the program area. When the data amount is small, more than one character and/or graphics pattern can be provided.

Thus, when a character and/or graphics pattern is inclined by an angle of about 171 degrees with the tracking direction and recorded in the predetermined character and/or graphics pattern area 20 in the CLV system and the portion of the character and/or graphics pattern area 20 is copied in the CAV system, the character and/or graphics pattern can be made to appear on the surface of the copy disk. Data may be recorded in the program area other than the character and/or graphics pattern area 20 of the original disk in either the CAV or CLV system.

Next, a third embodiment of the invention will be discussed.

In the third embodiment, when reproduction signals are read from a CLV system optical disk (original disk) produced by a publisher having the copyrights, and a copy disk is produced in the CLV system, a copyright character and/or graphics pattern appears on the copy disk. In the third embodiment, the pattern area is recorded in the CLV system and data portions other than the pattern area are recorded in the CAV or CLV system, and when the pattern area is copied in the CLV system, the character and/or graphics pattern appears on the copy disk (other data portions are copied in the CAV or CLV system). Therefore, whether or not the optical disk is an original or copy disk can be determined at a glance according to whether or not the character and/or graphics pattern exists.

The reason why the character and/or graphics pattern is invisible on the original disk and becomes visible on the copy disk will be discussed.

Figure 7A:
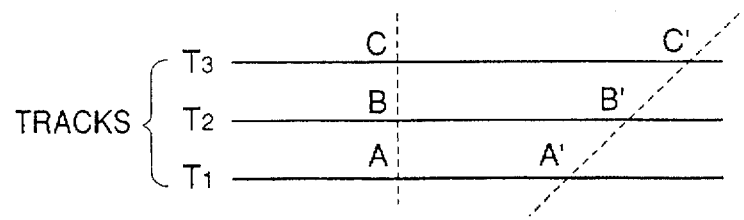
FIGS. 7A and 7B are illustrations showing the pit position relationship for each track of CD-ROM according to a third embodiment of the invention.
Figure 7B:
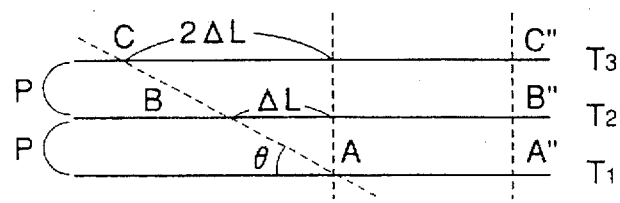

FIGS. 7A and 7B are partially enlarged views of tracks on an optical disk explaining the character and/or graphics pattern position relationship between original and copy disks. In FIGS. 7A and 7B, as in FIGS. 5A and 5B in the first embodiment, $T_1$, $T_2$, and $T_3$ denote three tracks, shown on an enlarged scale, contiguous to each other on the disk.

In FIG. 7A, assume that points A, B, and C, which are pit positions on the tracks $T_1$, $T_2$, and $T_3$ respectively, make up the contour of the character and/or graphics pattern recorded on the original disk in the CLV system. When reproduction signals of the original disk are used to produce a CLV system copy disk, the points A, B, C move relatively, to points A', B', C', for example, on the copy disk because of the difference between the tracking linear velocity when the original disk is produced and that when the copy disk is produced. That is, if there is a difference between the tracking linear velocity when the original disk is produced and that when the copy disk is produced, a difference occurs between the pit spacing on the original disk and that on the copy disk.

Likewise, the points A, B, C previously inclined as shown in FIG. 7B on the original disk may be arranged in the vertical direction like points A", B", C" on the copy disk, depending on the difference between the tracking linear velocity when the original disk is produced and that when the copy disk is produced.

If the inclination angle θ of the points A, B, C forming the contour of the character and/or graphics pattern in FIG. 7B is made to approach 0 or 180 degrees, the character and/or graphics pattern on the original disk is pushed down or tilted in the horizontal direction and becomes impossible to visually determine. When the difference between the tracking linear velocity when the original disk is produced and that when the copy disk is produced becomes a predetermined value, the character and/or graphics pattern thus recorded invisibly on the original disk is arranged in the vertical direction like the points A", B", C" on the copy disk and becomes visually determinable.

Assuming that the tracking linear velocity when the original disk is produced is v, that the difference between the tracking linear velocity when the original disk is produced and that when the copy disk is produced is Δv, and that the radius from the rotation center of the disk to track $T_2$ is R, the movement distance from point B to point B' in FIG. 7B, ΔL, becomes as in Expression (7):

$$\Delta L = 2\pi R (\Delta v / v) \tag{7}$$

That is, the distance ΔL corresponds to the shift amount from one revolution, of the distance where the copy disk rotates at linear velocity V+Δv while the master disk of the original disk rotates one revolution at linear velocity V.

Therefore, assuming that the track pitch is p, the inclination angle θ becomes as shown in Expression (8):

$$\theta = \tan^{-1}(p/\Delta L) \tag{8}$$

The embodiment uses such a velocity difference for recording more than one invisible character and/or graphics pattern with pits arranged at the inclination angle θ on the original disk. When the difference between the tracking linear velocity when the original disk is produced and that when the copy disk is produced becomes a value for correcting the inclination angle of each character and/or graphics pattern on the original disk and arranging the pattern in the vertical direction, the corresponding character and/or graphics pattern appears as a visible pattern on the copy disk. Therefore, if a character and/or graphics pattern appears on an optical disk, the disk can be determined to be a copy disk.

To make the patterns visible, since the shortest pit length on CD-ROM, 3T, is 0.9 μm, it is necessary to set ΔL to 0.9 μm or less and the inclination θ in the range of 90±29.4 degrees from Expression (8) if p=1.6 μm.

Therefore, if Expression (7) is changed like Expression (9) and tracking linear velocity v=1.3m/s and radius R=41.5 mm, the velocity difference can be represented as follows:

$$\Delta v = \Delta L \times v / (2\pi R) = 4.5 \times 10^{-6} \tag{9}$$

In this case, if a character and/or graphics pattern is recorded on the copy disk at a tracking linear velocity in the range of 1.2999955 m/s to 1.3000045 m/s, the character and/or graphics pattern becomes visible. Conversely, if the original disk is produced at a tracking linear velocity of 1.2999955 m/s or less or 1.3000045 m/s or more, the character and/or graphics pattern becomes invisible.

If the copy disk tracking velocity is unknown, character and/or graphics patterns may be prepared at various tracking velocities on the original disk. For example, the character and/or graphics pattern area may be divided into subareas in which character and/or graphics patterns can be recorded at different tracking linear velocities, as described below.

To make a character and/or graphics pattern visible on the copy disk, the tracking linear velocity is changed linearly, whereby the character and/or graphics pattern can be made to appear at any tracking velocity.

Although the tracks $T_1$, $T_2$, $T_3$, etc., are found as approximations to true circles in the description, the tracks are formed as a spiral on an actual CD-ROM, and thus the length of each track differs slightly from the above-mentioned values. As a result, the character and/or graphics pattern on the copy disk becomes somewhat contorted, and this contortion may be removed by correcting the difference in each track length on the spiral track before recording.

Next, the recording position of the character and/or graphics pattern in the third embodiment will be discussed with reference to FIGS. 9A to 9C.

If the character and/or graphics pattern area of the original disk is placed in the program area, the CD-ROM data storage capacity decreases. In the embodiment, the character and/or graphics pattern area is provided in at least either of the inside of the read in area or the outside of the read out area.

To write into the outside of the read out area, since the read out diameter is Ø117 as shown in FIGS. 9A to 9C, if a character and/or graphics pattern, for example, 2.5 mm wide is recorded, the character and/or graphics pattern area encroaches into the program area, decreasing the CD-ROM data storage capacity.

In contrast, to place the character and/or graphics pattern area in the inside of the read in area, since the read in start diameter is Ø46, the inner diameter of the character and/or graphics pattern area 2.5 mm wide becomes Ø41, which is sufficiently outside the clamp area outer diameter Ø33 required to clamp the disk.

Therefore, a character and/or graphics pattern can be easily written into the inside of the read in area and the CD-ROM data storage capacity is not decreased. The character and/or graphics pattern area width is a reasonable width for clearly identifying characters, graphics.

Figure 13:
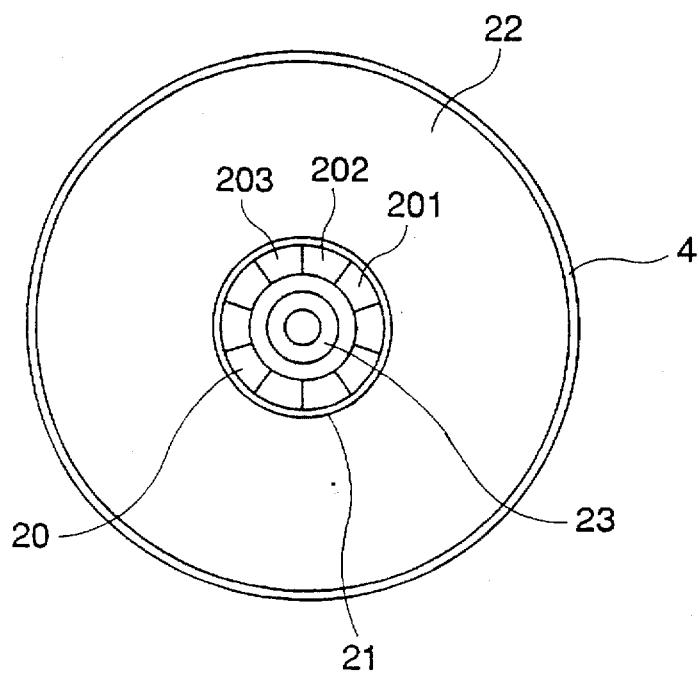
FIG. 13 is an illustration showing a character and/or graphics pattern area of the CD-ROM according to the third embodiment of the invention.

FIG. 13 is a top view of the CD with the character and/or graphics pattern area provided in the inside of the read in area. As shown in FIG. 13, the character and/or graphics pattern area 20 of 2.5 mm wide is written into the inside of the read in area 21 and does not encroach into the program area 22 or clamp area 23. The character and/or graphics pattern area 20 is divided into subareas 201, 202, 203, ... in which character and/or graphics patterns can be recorded at different tracking linear velocities. Different character and/or graphics patterns may be recorded in the subareas.

A thin mirror portion may be provided between the read in start diameter and the character and/or graphics pattern area 20.

If the read out area or the outside thereof can be made sufficiently wide, a character and/or graphics pattern may be recorded in or outside the read out area, needless to say.

When the data amount is small, a character and/or graphics pattern can also be recorded in the program area. When the data amount is small, more than one character and/or graphics pattern can be provided.

Thus, when a character and/or graphics pattern is recorded in the predetermined character and/or graphics pattern area 20 in the CLV system and the portion of the character and/or graphics pattern area 20 is copied in the CLV system at different tracking linear velocities, the character and/or graphics pattern can be made to appear on the surface of the copy disk. Data may be recorded in the program area other than the character and/or graphics pattern area 20 of the original disk in either the CAV or CLV system.

Next, a fourth embodiment of the invention will be discussed.

In the fourth embodiment, when reproduction signals are read from a CAV system optical disk (original disk) produced by a publisher having the copyrights and a copy disk is produced in the CLV system, a copyright character and/or graphics pattern appears on the copy disk. In the fourth embodiment, the pattern area is recorded in the CAV system and data portions other than the pattern area are recorded in the CLV or CAV system, and when the pattern area is copied in the CAV system, the character and/or graphics pattern appears on the copy disk (other data portions are copied in the CLV or CAV system). Therefore, whether or not the optical disk is an original or copy disk can be determined at a glance according to whether or not the character and/or graphics pattern exists.

In this case, pit position shift caused by the tracking linear velocity difference between original and copy disks can also be used.

According to the embodiment, there can also be provided optical disks such as CD-ROMs formed with a character and/or graphics pattern which is invisible on an original disk and visible on a copy disk produced by copying the original disk.

We have discussed the embodiments of the invention by taking CD-ROM disks as an example, but the invention can also produce similar effects if it is applied to other optical information recording media, such as optical cards.

FIGS. 10A to 10D show recording and reproducing principles of optical cards.

Figure 10A:
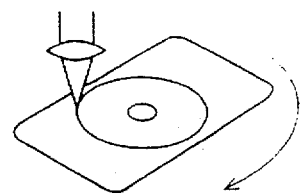
FIGS. 10A to 10D are illustrations showing optical card recording and reproducing systems.
Figure 10B:
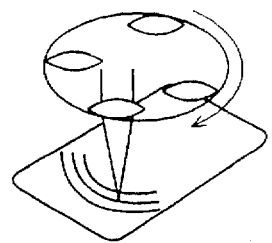
Figure 10C:
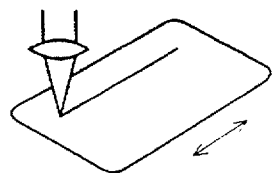
Figure 10D:
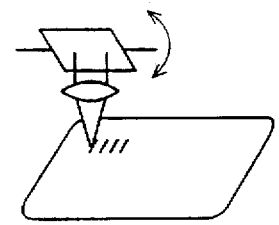

The optical card recording and reproducing systems include the card rotation type shown in FIG. 10A, head rotation type shown in FIG. 10B, card reciprocating type shown in FIG. 10C, and beam scan type shown in FIG. 10D.

The card rotation type and head rotation type shown in FIGS. 10A and 10B adopt essentially the same signal recording system as CD-ROMs. Therefore, the first to fourth embodiments can be applied to them directly to produce similar effects.

The card reciprocating type and beam scan type shown in FIG. 10C and 10D can be treated as partially taking out the CD rotation motion, linearizing circular tracks, and changing unidirectional movement motion to reciprocation. Therefore, the tracking direction is alternately reversed, so that similar effects to those of the embodiments can be produced by inclining component points of a character and/or graphics pattern with respect to the tracking directions, and recording them on an original.

To make characters and/or graphics visible on a copy disk in the first and third embodiments, if the linear velocity is controlled at tracking linear velocity deviation factor between original and copy disks, $\Delta v/v$ is $1\times10^{-6}$ or less, position shift caused by the tracking linear velocity difference can be prevented.

Pit position pattern matching is available as a method of determining whether or not a disk is an original or copy disk in addition to visual check. Further, in the first and second embodiments, rotation speeds of tracks in the character and/or graphics pattern area are detected and whether or not they match is determined for determining whether the character and/or graphics area recording system is CAV or CLV, thereby determining whether or not the disk is an original or copy disk. In the third embodiment, whether or not a pattern is recorded at speed making characters and/or graphics visible can be determined by determining the rotation speed on one track.

If a function is provided which determines whether or not reproduced data and collation data match at the time of reproduction and disables reproduction if they do not match, data in the character and/or graphics pattern area must also be copied.

We have discussed the embodiments of the invention.

According to the embodiments of the invention, there can be provided optical disks such as CD-ROMs formed with a character and/or graphics pattern which is invisible on an original disk and visible on a copy disk produced by copying the original disk.

Further, if an optical disk of a copy disk is produced from an optical disk of such an original disk, a character and/or graphics pattern is visible and the copy disk can be instantly identified by visual check. It can be expected that this fact will have the effect of deterring unauthorized copying.

Further, each character and/or graphics pattern is recorded in the outer peripheral portion of the program out diameter of an information recording optical disk or in the inner peripheral portion of the read in start diameter, whereby the character and/or graphics pattern can be recorded without impairing the information recording capacity of the optical disk.

Similar character and/or graphics patterns to those of optical disks can be recorded on optical cards of various systems for producing similar effects to those of optical disks.

Thus, according to the invention, original disks can be produced in a production process similar to the conventional process and an identifiable pattern appears on an unauthorized copy disk, enabling the disk to be easily identified as an unauthorized copy disk. A character and/or graphics pattern which is invisible on an original disk becomes visible on a disk produced by copying the original disk, so that the copy disk can be identified by visual check.

What is claimed is:

1. An information recording medium comprising a recording surface for recording information according to pits formed on a plurality of tracks, said information recording medium having a pattern recording area for recording specific data at a predetermined first tracking linear velocity for each track on the plurality of tracks, wherein said pits are disposed to form a pattern having no visibly recognizable character or graphics format on said surface, and said pits are further disposed for forming a visibly recognizable pattern of at least either characters or graphics on a copy medium in the event where said specific data is recorded on said copy medium from said information recording medium at a second tracking linear velocity different from the predetermined first tracking linear velocity, and wherein said visible pattern results from a difference in light reflection factors in said visibly recognizable pattern corresponding to the specific data.

2. The information recording medium as claimed in claim 1, wherein the predetermined first tracking linear velocity is controlled by a CAV (constant angular velocity) system for recording data at a constant rotation speed and wherein the second tracking linear velocity is controlled by a CLV (constant linear velocity) system for recording data at a constant tracking linear velocity.

3. The information recording medium as claimed in claim 2 wherein two pits corresponding to a pit on the track on which the specific pit pattern is formed and a pit on a contiguous track placed vertically to a tracking direction are placed deviating from each other in the track direction with respect to the vertical direction on the two contiguous tracks.

4. The information recording medium as claimed in claim 3 wherein when the velocity is controlled by the CAV system, the deviating comprises an angle defined by a line connecting the two pits with respect to the tracking direction, the angle being about 9 degrees.

5. The information recording medium as claimed in claim 2 wherein a range of the tracking linear velocities controlled by the CAV system contains a predetermined allowable tracking linear velocity range that the tracking linear velocities controlled by the CLV system can include.

6. The information recording medium as claimed in claim 5 wherein the predetermined allowable tracking linear velocity range is 1.2 to 1.4 (m/s).

7. The information recording medium as claimed in claim 1 having a plurality of the pattern recording areas on the recording surface.

8. The information recording medium as claimed in claim 7 wherein said plurality of pattern recording areas are a plurality of ring-shaped areas separated from each other.

19

9. The information recording medium as claimed in claim 7 wherein said plurality of pattern recording areas are a plurality of ring-shaped areas contiguous to each other.

10. The information recording medium as claimed in claim 7 wherein said plurality of pattern recording areas are a plurality of areas into which a ring-shaped recording area is divided in a circumferential direction.

11. The original information recording medium as claimed in claim 1 wherein the pattern recording area is provided in at least one of an outer peripheral side of a read out area indicating an end position of a data recording area and an inner side of a read area indicating a start position of the data recording area.

12. The information recording medium as claimed in claim 1 wherein the pattern recording area is provided in the outer peripheral side of a read out area indicating the end position of a data recording area and wherein a mirror area containing no pits is provided between the pattern recording area and the read out area.

13. The information recording medium as claimed in claim 1 wherein the pattern recording area is provided in the inner side of a read in area indicating the start position of a data recording area and wherein a mirror area containing no pits is provided between the pattern recording area and the read in area.

14. The information recording medium as claimed in claim 1 wherein at least either one of the character pattern and graphics pattern is a pattern representing at least one of copyrights to information recorded on said information recording medium; a trademark assigned to, at least either one of said information recording medium and data recorded on said information recording medium; and a pattern representing other rights to, at least either one of said information recording medium and data recorded on said information recording medium.

15. An information recording medium comprising a recording surface for recording information according to a pit pattern formed on a plurality of tracks corresponding to record data, said information recording medium having a pattern recording area for recording specific data, wherein the data provides that said pit pattern is disposed to form no visibly recognizable character or graphics on said recording surface and further disposed to form a visible pattern of at least either characters or graphics on a copy medium and wherein said pit pattern is selectively inclined to such a degree that the pit pattern cannot be visually identified on the recording medium because of a light reflection factor difference between areas caused by a data in a manner so that two pits corresponding to a pit on the track on which the specific pit pattern is formed, and a pit on a contiguous track placed vertically to a tracking direction, are placed deviating from each other in the track direction with respect to the vertical direction on the two contiguous tracks.

16. An original information recording medium comprising a recording surface for recording information according to a first pit pattern formed on a plurality of tracks corresponding to record data, said original information recording medium having a pattern recording area for recording specific data at a tracking linear velocity controlled by a CLV (constant linear velocity) system for recording data at constant tracking linear velocity on the plurality of tracks, said first pit pattern having no visibly recognizable format on the original recording medium, and wherein when said specific data is recorded on a different information recording medium from the original recording medium at a tracking linear velocity controlled by a CAV (constant angular velocity) system for recording data at constant rotation speed, wherein the data provides, on the different information recording medium, a visible pit pattern of at least either characters or graphics resulting from a light reflection factor difference between different areas of the visible pit pattern corresponding to the specific data.

17. The original information recording medium as claimed in claim 16 wherein two pits corresponding to the pit on the track on which the first pit pattern is formed and a pit on a contiguous track placed vertically to a tracking direction are placed deviating from each other in the track direction with respect to the vertical direction on the two contiguous tracks.

18. The original information recording medium as claimed in claim 17 wherein when the tracking linear velocity is controlled by the CLV system, and an angle, comprising a line connecting the two pits is formed with respect to the tracking direction, at about 171 degrees.

19. The original information recording medium as claimed in claim 16 wherein the tracking linear velocity controlled by the CLV system is within a predetermined allowable tracking linear velocity range that the tracking linear velocities controlled by the CAV system can include.

20. The original information recording medium as claimed in claim 16 having a plurality of pattern recording areas on the recording surface thereof.

21. The original information recording medium as claimed in claim 20 wherein said plurality of pattern recording areas are a plurality of ring-shaped areas contiguous to each other.

22. The original information recording medium as claimed in claim 20 wherein said plurality of pattern recording areas are a plurality of ring-shaped areas separated from each other.

23. The original information recording medium as claimed in claim 20 wherein said plurality of pattern recording areas are a plurality of areas into which a ring-shaped recording area is divided in a circumferential direction.

24. The original information recording medium as claimed in claim 16 wherein the pattern recording area is a ring-shaped area.

25. The original information recording medium as claimed in claim 24 wherein a ratio between an outer diameter and an inner diameter of the pattern recording area in the CLV system is set larger than an allowable rotation speed ratio of the CAV system.

26. The original information recording medium as claimed in claim 16 wherein the pattern recording area is provided in at least one of an outer peripheral side of a read out area indicating an end position of a data recording area and an inner side of a read in area indicating a start position of the data recording area.

27. The information recording medium as claimed in claim 16 wherein the pattern recording area is provided in the outer peripheral side of a read out area indicating the end position of a data recording area and wherein a mirror area containing no pits is provided between the pattern recording area and the read out area.

28. The information recording medium as claimed in claim 16 wherein the pattern recording area is provided in the inner side of a read in area indicating the start position of a data recording area and wherein a mirror area containing no pits is provided between the pattern recording area and the read in area.

29. The information recording medium as claimed in claim 16 wherein at least either one of the character pattern and graphics pattern is a pattern representing at least one of copyrights to information recorded on said information recording medium; a trademark assigned to, at least either one of said information recording medium, and data recorded on said information recording medium; and a pattern representing other rights to at least either one of said information recording medium and data recorded on said information recording medium.

30. An information recording medium comprising a recording surface for recording information according to a pit pattern formed on a plurality of tracks corresponding to record data, said information recording medium having a pattern recording area for recording specific data at a first tracking linear velocity predetermined by a specific tracking linear velocity control system for each track on a plurality of tracks, wherein said pit pattern is disposed to form no visibly recognizable pattern on said information recording medium and when said specific data is recorded on a different information recording medium at a second tracking linear velocity different from the first tracking linear velocity, the data provides on the different information recording medium, a visible pit pattern of at least characters or graphics resulting from light reflection factor differences in the visible pit pattern corresponding to the specific data.

31. The information recording medium as claimed in claim 30 wherein two pits corresponding to a pit on the track on which the specific pit pattern is formed and a pit on a contiguous track placed vertically to a tracking directed are placed to deviate from each other in the track direction with respect to the vertical direction on the two contiguous tracks.

32. The information recording medium as claimed in claim 30 wherein the specific tracking linear velocity control system is at least one of a CLV (constant linear velocity) system for recording data at a constant tracking linear velocity and a CAV (constant angular velocity) system for recording data at a constant rotation speed.

33. The information recording medium as claimed in claim 30 wherein the second tracking linear velocity is within a predetermined allowable tracking linear velocity range.

34. The information recording medium as claimed in claim 30 having a plurality of the pattern recording areas on the recording surface thereof.

35. The information recording medium as claimed in claim 34 wherein said plurality of pattern recording areas are a plurality of ring-shaped areas separated from each other.

36. The information recording medium as claimed in claim 34 wherein said plurality of pattern recording areas are a plurality of ring-shaped areas contiguous to each other.

37. The information recording medium as claimed in claim 34 wherein said plurality of pattern recording areas are a plurality of areas into which a ring-shaped recording area is divided in a circumferential direction.

38. The information recording medium as claimed in claim 34 wherein said plurality of pattern recording areas consist of a plurality of areas into which a ring-shaped recording area is divided in a circumferential direction and wherein data is recorded at a second tracking velocity varying for each of said plurality of division areas.

39. The information recording medium as claimed in claim 30 wherein the pattern recording area is provided in at least one of an outer peripheral side of a read out area indicating an end position of a data recording area and an inner side of a read in area indicating a start position of the data recording area.

40. The information recording medium as claimed in claim 30 wherein the pattern recording area is provided in the outer peripheral side of a read out area indicating the end position of a data recording area and wherein a mirror area containing no pits is provided between the pattern recording area and the read out area.

41. The information recording medium as claimed in claim 30 wherein at least one of the character pattern and graphics pattern is a pattern representing at least one of copyrights to information recorded on said information recording medium; a trademark assigned to at least either one of said information recording medium, and data recorded on said information recording medium; and a pattern representing other rights to at least either one of said information recording medium, and data recorded on said information recording medium.

42. The information recording medium as claimed in claim 30 wherein the pattern recording area is provided in the inner side of a read in area indicating the start position of a data recording area and wherein a mirror area containing no pits is provided between the pattern recording area and the read in area.

43. A method of generating a predetermined pit pattern on a recording disk in anticipation of a relative repositioning of the pit pattern on an unauthorized copy disk resulting from a different tracking velocity between the recording disk and the unauthorized copy disk, to form a desired visible pattern on the unauthorized copy disk, comprising the steps of:

identifying pit patterns wherein differences in light reflection factors between different portions of the pit patterns form visible patterns when recorded on a disk; and recording specific data on the recording disk in a first predetermined pattern, wherein the pit patterns of the specific data are located to avoid formation of the desired visible pattern and wherein the pit patterns are further located on the recording disk to be repositioned when copied to the unauthorized copy disk to form the desired visible pattern, whereby the unauthorized copy disk can be readily identified by the visible pattern.

* * * * *